United States Patent
Takahashi et al.

(10) Patent No.: US 12,184,119 B2
(45) Date of Patent: Dec. 31, 2024

(54) ROTARY ELECTRIC MACHINE AND VEHICLE

(71) Applicant: Hitachi Astemo, Ltd., Hitachinaka (JP)

(72) Inventors: Akeshi Takahashi, Tokyo (JP); Minori Nagata, Tokyo (JP); Masanori Sawahata, Tokyo (JP)

(73) Assignee: Hitachi Astemo, Ltd., Hitachinaka (JP)

(*) Notice: Subject to any disclaimer, the term of this patent is extended or adjusted under 35 U.S.C. 154(b) by 510 days.

(21) Appl. No.: 17/287,839

(22) PCT Filed: Jan. 8, 2020

(86) PCT No.: PCT/JP2020/000229
§ 371 (c)(1),
(2) Date: Apr. 22, 2021

(87) PCT Pub. No.: WO2020/162087
PCT Pub. Date: Aug. 13, 2020

(65) Prior Publication Data
US 2021/0384779 A1    Dec. 9, 2021

(30) Foreign Application Priority Data
Feb. 5, 2019   (JP) .................................. 2019-018783

(51) Int. Cl.
*H02K 1/16*      (2006.01)
*B60L 50/51*     (2019.01)
*H02K 3/48*      (2006.01)

(52) U.S. Cl.
CPC ............... *H02K 1/16* (2013.01); *B60L 50/51* (2019.02); *H02K 3/48* (2013.01)

(58) Field of Classification Search
CPC ... H02K 1/16; H02K 3/48; H02K 3/12; B60L 50/51; B60L 2220/50; Y02T 10/64; Y02T 10/70
See application file for complete search history.

(56) References Cited

U.S. PATENT DOCUMENTS

| | | | |
|---|---|---|---|
| 5,804,902 A | 9/1998 | Hill | |
| 6,865,796 B1 * | 3/2005 | Oohashi | H02K 3/12 242/432 |

(Continued)

FOREIGN PATENT DOCUMENTS

| | | |
|---|---|---|
| DE | 10 2014 224 393 A1 | 6/2016 |
| JP | 10-501957 A | 2/1998 |

(Continued)

OTHER PUBLICATIONS

Translation of JP5986774B2. Retreived from USPTO. Date: Aug. 24, 2023 (Year: 2023).*

(Continued)

*Primary Examiner* — Christopher M Koehler
*Assistant Examiner* — Riley Owen Stout
(74) *Attorney, Agent, or Firm* — Crowell & Moring LLP

(57) ABSTRACT

An object of the present invention is to provide a highly efficient and highly reliable rotary electric machine. A rotary electric machine includes: a stator around which a plurality of coils are wound; and a rotor which is supported to be freely rotatable with a predetermined gap with respect to the stator. The coil has at least one connection portion per turn in a slot of the stator. Conductors to be connected mutually have steps at the connection portion, and are fitted with other conductors so as to mutually fill the steps. The steps have contact surfaces that come into contact with each other in the slot to be electrically conducted. A thermally expandable sheet capable of pressurizing the coil in a radial direction of the stator is arranged in the slot.

10 Claims, 8 Drawing Sheets

(56) References Cited

U.S. PATENT DOCUMENTS

| | | | | |
|---|---|---|---|---|
| 10,510,464 | B1* | 12/2019 | Gronowski | H02K 3/12 |
| 2012/0293037 | A1 | 11/2012 | Uchida et al. | |
| 2013/0300248 | A1* | 11/2013 | Ishida | H02K 15/10 |
| | | | | 310/214 |
| 2016/0172919 | A1 | 6/2016 | Hattori | |
| 2018/0152068 | A1* | 5/2018 | Götz | H02K 3/12 |
| 2020/0366146 | A1* | 11/2020 | Koga | H02K 3/28 |

FOREIGN PATENT DOCUMENTS

| | | | |
|---|---|---|---|
| JP | 11-285217 | A | 10/1999 |
| JP | 2006050853 | A | 2/2006 |
| JP | 2006-158044 | A | 6/2006 |
| JP | 2010-68590 | A | 3/2010 |
| JP | 2012-244719 | A | 12/2012 |
| JP | 2013-208038 | A | 10/2013 |
| JP | 2015-23771 | A | 2/2015 |
| JP | 5986774 | B2 * | 9/2016 |
| JP | 2017-184394 | A | 10/2017 |

OTHER PUBLICATIONS

International Search Report (PCT/ISA/210) issued in PCT Application No. PCT/JP2020/000229 dated Apr. 21, 2020 with English translation (four (4) pages).
Japanese-language Written Opinion (PCT/ISA/237) issued in PCT Application No. PCT/JP2020/000229 dated Apr. 21, 2020 (four (4) pages).
Japanese-language Office Action issued in Japanese Application No. 2019-018783 dated Apr. 18, 2023 with English translation (8 pages).
Chinese-language Office Action issued in Chinese Application No. 202080006595.5 dated Jun. 28, 2024 with English translation (15 pages).
Office Action issued in Chinese Application No. 202080006595.5 dated Oct. 31, 2024, (15 pages), w/English Translation.

* cited by examiner

RADIAL DIRECTION

CIRCUMFERENTIAL ← ⊗ AXIAL DIRECTION
DIRECTION

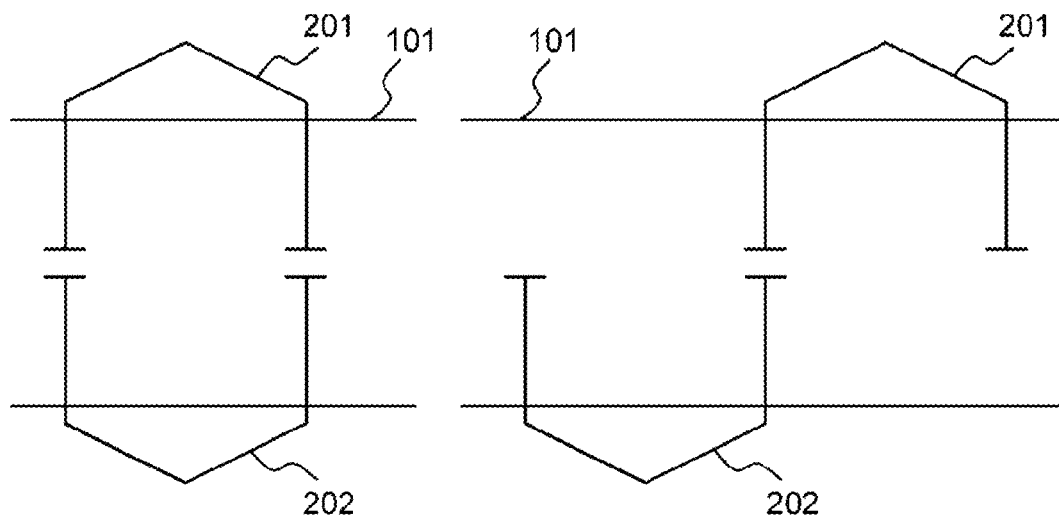

ROTARY ELECTRIC MACHINE AND VEHICLE

TECHNICAL FIELD

The present invention relates to a rotary electric machine.

BACKGROUND ART

Variable speed drive rotary electric machines installed in railway vehicles, automobiles, construction machines, and the like have become faster in drive rotation speed in order for miniaturization. This is an attempt to obtain the same output with a small motor by increasing the rotation speed and decreasing the torque since the motor output is proportional to a product of the torque and the rotation speed. However, a power supply frequency increases as the speed increases, and thus, an AC copper loss of a stator coil increases, resulting in a decrease in efficiency and an increase in heat generation. The AC copper loss is a loss that occurs when a current distribution is biased in a coil conductor due to a magnetic flux that crosses a slot, and increases as a current, a frequency, or a conductor cross-sectional area increases.

The following related arts are the background arts in this technical field. PTL 1 (JP H11-285217) describes a stator of a vehicle alternator in which a plurality of conductor segments mounted on a stator core are arrayed in only one row while forming two or more pairs of layers in a slot.

Further, PTL 2 (JP 2015-023771 A) describes a stator for a rotary electric machine including: a stator core having plural slots; a one-side conductor segment whose first leg and second leg are inserted in first and second slots from one axial end side of the stator core; a first other-side conductor segment whose first leg is inserted in the first slot from the other axial end side of the stator core; a second other-side conductor segment whose second leg is inserted in the second slot from the other axial end side of the stator core; and a stator coil formed in such a manner that the respective legs that face each other are joined in each of the slots and a plurality of the one-side conductor segments and a plurality of the other-side conductor segments are sequentially joined.

CITATION LIST

Patent Literature

PTL 1: JP H11-285217 A
PTL 2: JP 2015-023771 A

SUMMARY OF INVENTION

Technical Problem

In a case of a distributed winding stator that is widely used in drive motors of automobiles, a manufacturing method is adopted in which the number of coil turns is reduced to several turns and adjacent coils are connected by welding at a stator axial end in order for mass production (see, for example, PTL 1). In order to reduce the AC copper loss with this structure, it is necessary to take measures such as forming a one-turn coil conductor with a multi-stage flat wire. However, when the number of stages of the coil conductor is increased, the number of welding points at connection portions of coil ends increases, which has a drawback that the manufacturing becomes complicated.

Further, in a method of welding the coil ends, problems such as damage to an insulating coating and poor welding are likely to occur in a coil bending process or a welding process at the time of forming the connection portion, so that there is a problem of ensuring the reliability of the motor.

As a conventional technique for solving this problem, there is a method of forming a fitting structure in a stator slot and joining coil conductors as described in PTL 2. However, it is difficult to solve the trade-off between fitting workability and long-term reliability in the technique described in PTL 2. Specifically, it is desirable to increase a clearance of a fitting portion to facilitate fitting and improve workability in order to fit a plurality of conductors forming a stator coil. However, if the clearance of the fitting portion is increased, the fitting portion is easily removed after the assembly, and it is difficult to ensure the reliability of a motor because the contact resistance greatly varies. On the other hand, if the clearance of the fitting portion is decreased, there occurs a case where fitting becomes difficult and it is difficult to ensure the electrical conduction, and it becomes necessary to apply a force in a fitting direction at the time of fitting. Thus, there is a possibility that the fitting portion is deformed and it is difficult to ensure the electrical conduction. In this manner, it becomes difficult to ensure the reliability in any case. Further, even if the tolerance can be controlled so as to facilitate the fitting and prevent the removal, production management cost required for the tolerance control increases, and thus, the product price rises.

An object of the present invention is to provide a highly efficient and highly reliable rotary electric machine and a vehicle equipped with the same.

Solution to Problem

In order to achieve the above object, the present invention includes various embodiments. An example thereof is a rotary electric machine including: a stator around which a plurality of coils are wound; and a rotor which is supported to be freely rotatable with a predetermined gap with respect to the stator. The coil has at least one connection portion per turn in a slot of the stator. Conductors to be connected mutually have steps at the connection portion, and are fitted with other conductors so as to mutually fill the steps. The steps have contact surfaces that come into contact with each other in the slot to be electrically conducted. A thermally expandable sheet capable of pressurizing the coil in a radial direction of the stator is arranged in the slot.

Advantageous Effects of Invention

According to the present invention, it is possible to provide the highly efficient and highly reliable rotary electric machine and the vehicle equipped with the same. Other objects, configurations, and effects which have not been described above will become apparent from embodiments to be described hereinafter.

BRIEF DESCRIPTION OF DRAWINGS

FIGS. 10A and 10B are diagrams illustrating a configuration of a one-turn coil.

DESCRIPTION OF EMBODIMENTS

Hereinafter, embodiments of the present invention will be described with reference to drawings. In the following description, the same components will be denoted by the same signs. Names and functions thereof are the same, and duplicate descriptions thereof will be avoided. In the present invention, a "coil" is defined as one turn of a hexagonal winding or one cycle of a wave winding. Therefore, for example, a configuration in which the coil is wound four turns is expressed as a four-turn coil. Further, a "configuration in which the coil has a connection portion inside a stator core" is defined as a configuration illustrated in FIG. 10($a$) or FIG. 10($b$). Further, when the one-turn coil is formed of a plurality of conductors, the plurality of conductors are collectively referred to as a coil conductor unless otherwise specified. Further, a rotary electric machine driven at a variable speed such as an automobile and a railroad vehicle is illustrated in the following description, but the rotary electric machine to which the present invention is applied is not limited thereto. The present invention can be applied to all rotary electric machines including rotary electric machines driven at a constant speed. Further, the rotary electric machine to which the present invention is applied may be an induction machine, a permanent magnet synchronous machine, a winding type synchronous machine, or a synchronous reluctance rotary machine. Further, an inner-rotor-type rotary electric machine is illustrated in the following description, but the present invention can also be applied to an outer-rotor-type rotary electric machine. Further, a material of the coil conductor forming the rotary electric machine to which the present invention is applied may be copper, aluminum, or other conductive material.

First Embodiment

Figure 1:
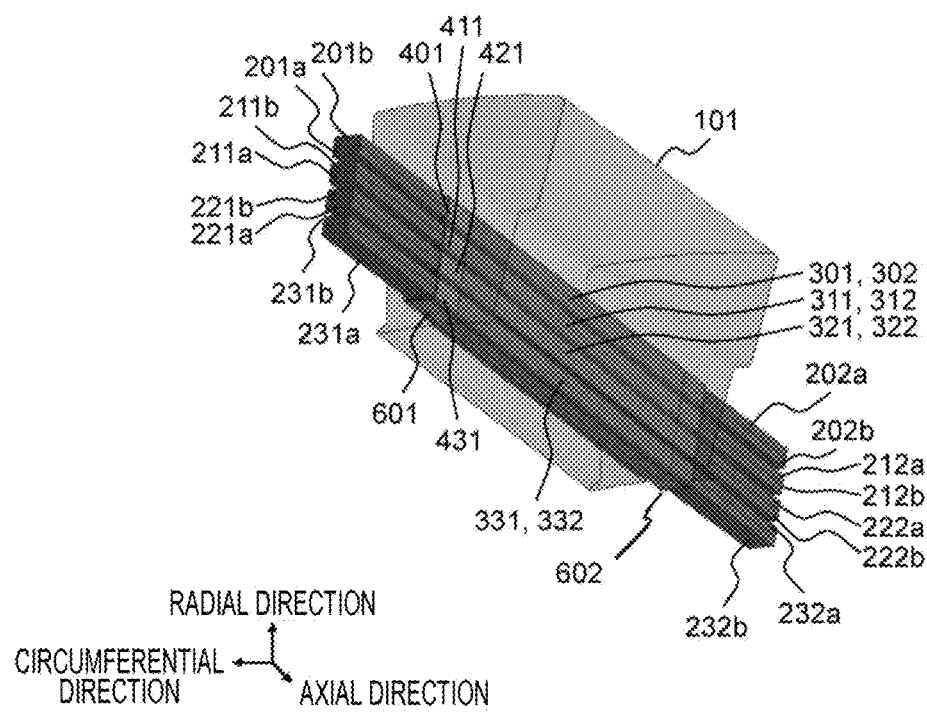
FIG. 1 is a view illustrating a coil configuration according to a first embodiment of the present invention.
Figure 2A:
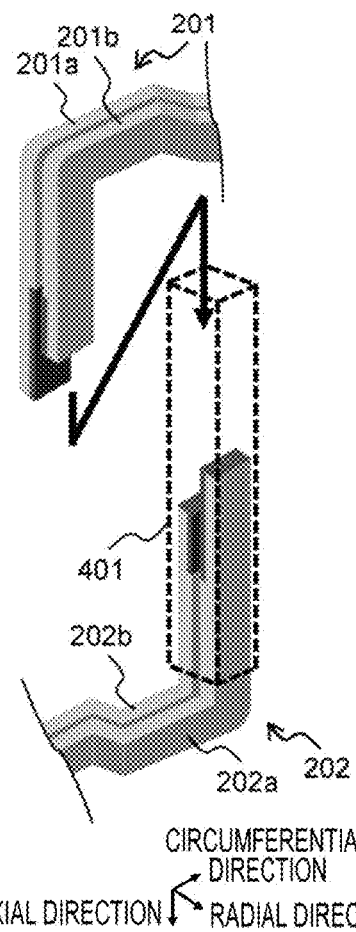
FIGS. 2A-2C are views illustrating a method of connecting coil conductors according to the first embodiment of the present invention.
Figure 2B:
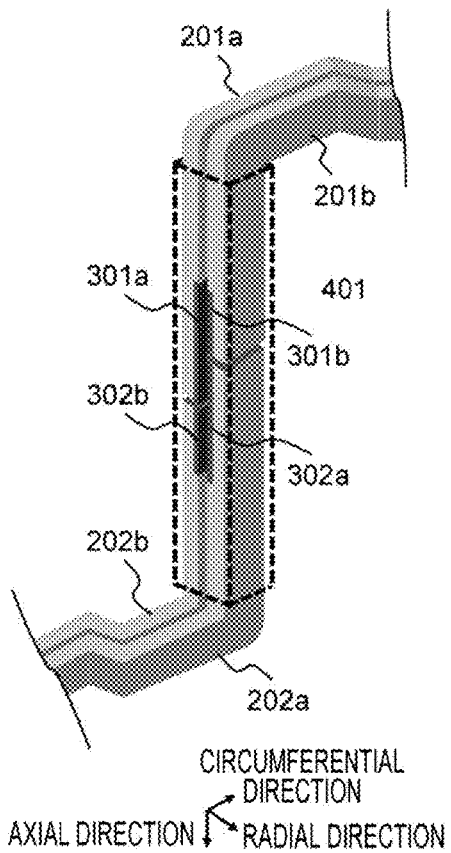
Figure 2C:
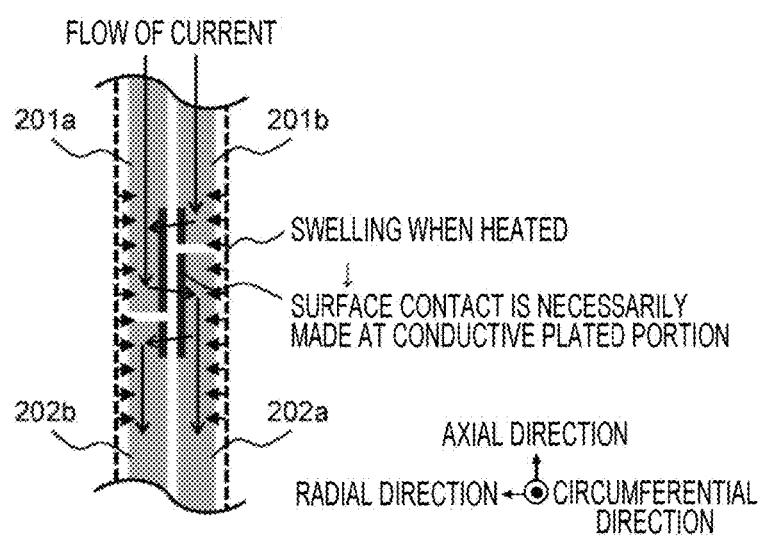
Figure 3A:
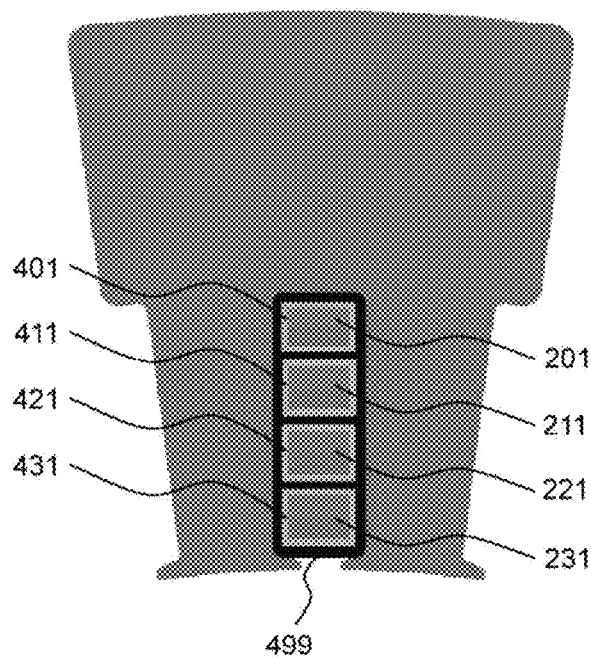
FIGS. 3A and 3B are cross-sectional views of a coil according to the first embodiment of the present invention.
Figure 3B:
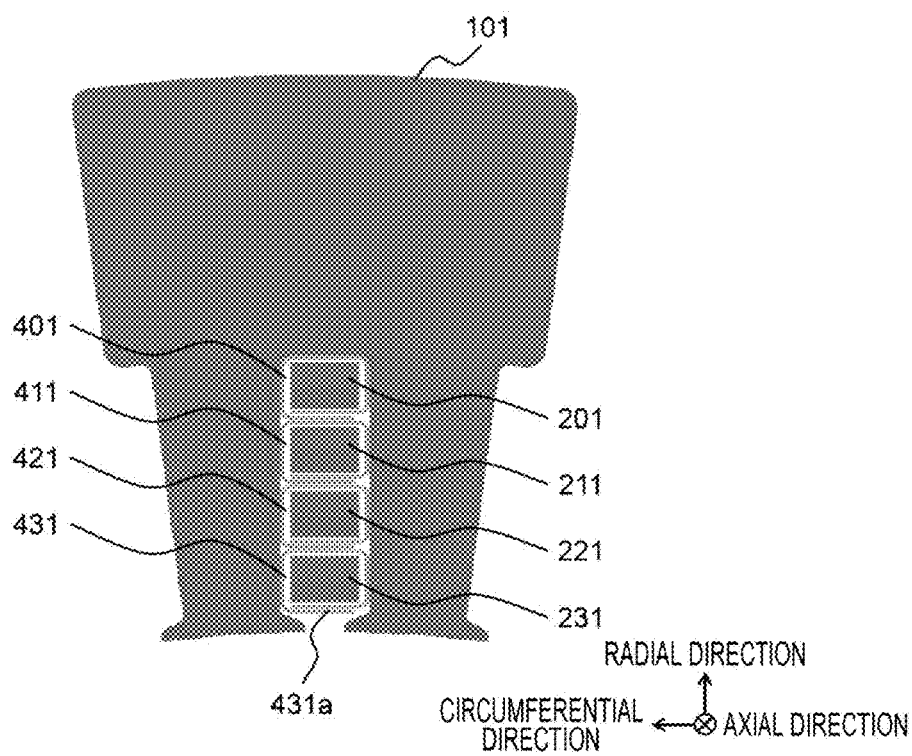
Figure 4:
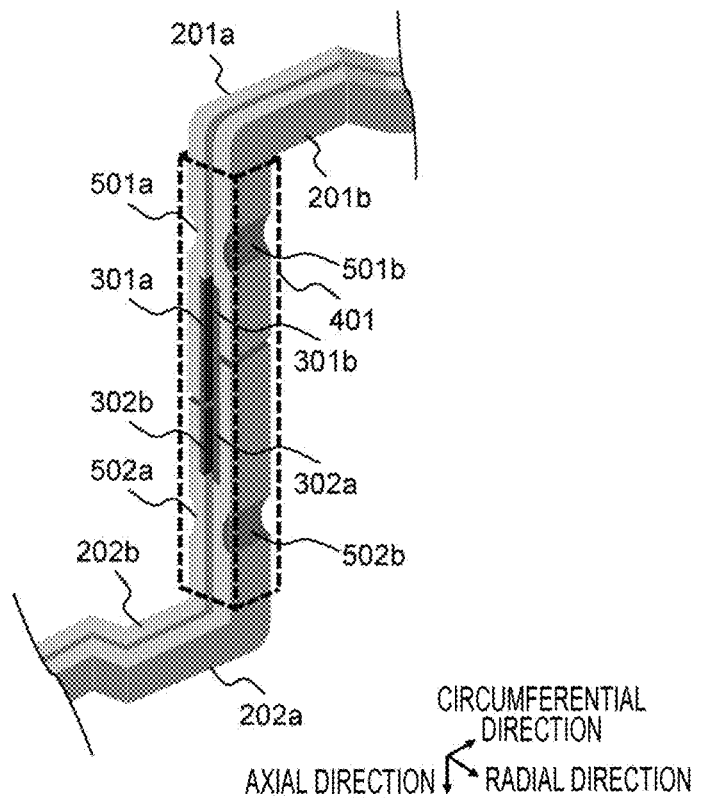
FIG. 4 is a view illustrating a method of fixing a connection portion of the coil according to the first embodiment of the present invention.
Figure 5:
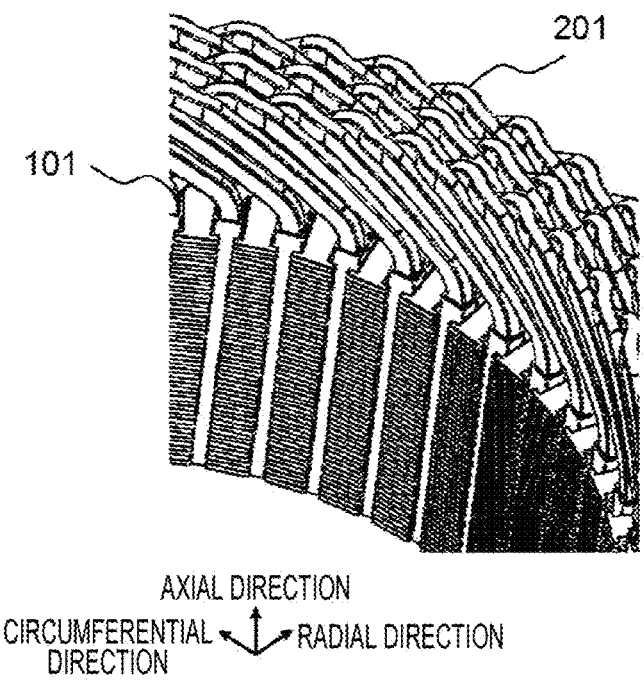
FIG. 5 is an external view of a stator coil according to the first embodiment of the present invention.

Hereinafter, a first embodiment of the present invention will be described with reference to FIGS. 1 to 5. FIG. 1 is a view illustrating a coil configuration according to the first embodiment of the present invention. FIG. 2 is a view illustrating a method of connecting coil conductors according to the first embodiment of the present invention. FIG. 3 is a cross-sectional view of a coil according to the first embodiment of the present invention. FIG. 4 is a view illustrating a method of fixing a connection portion of the coil according to the first embodiment of the present invention. FIG. 5 is an external view of a stator coil according to the first embodiment of the present invention.

An overall configuration of the stator coil of the present embodiment will be described with reference to FIGS. 1 and 2. In FIG. 1, a stator 101 includes an inner rotor (not illustrated) that is supported to be freely rotatable in the circumferential direction with a gap on the radially inner peripheral side. The stator 101 has a plurality of slots in the circumferential direction, and a coil conductor is inserted into the slot. The coil conductor is coated with an insulating coating such as epoxy resin to ensure insulation between coils. FIG. 1 illustrates one slot of the stator 101 and coils 201, 211, 221, and 231 corresponding to four turns and inserted in the slot. For example, in a case of an automobile drive motor, a one-turn coil is formed with one conductor in many cases due to the mass production, but there is known a method of forming a one-turn coil with a multi-stage flat wire to reduce an AC copper loss because the AC copper loss increases during high-speed rotation. Hereinafter, first, a configuration in which the AC copper loss is reduced by the above configuration will be described with reference to FIG. 9.

Figures 9A, 9B:
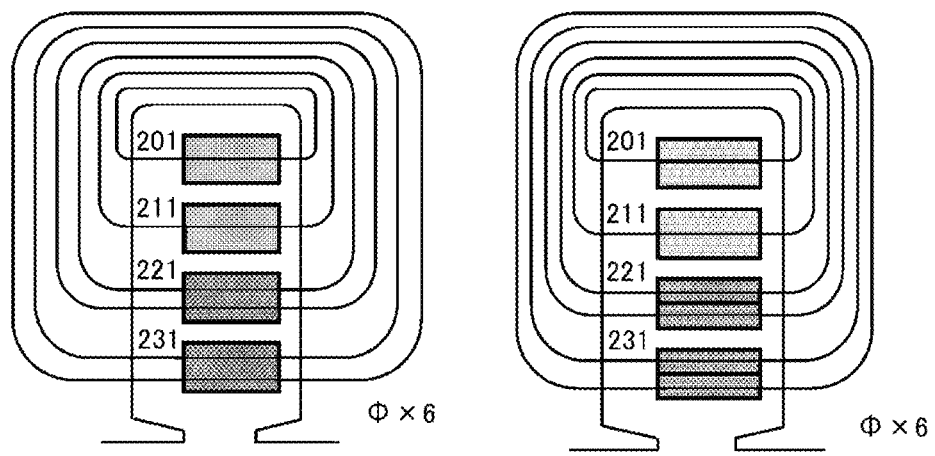
FIGS. 9A and 9B are magnetic flux diagrams in a cross section of a slot of a stator when a motor is energized.

FIG. 9 is a magnetic flux diagram in a cross section of a slot of a stator when a motor is energized. The coils 201, 211, 221, and 231 corresponding to four turns are inserted in one slot similarly to FIG. 1. FIG. 9($a$) illustrates a case where a one-turn coil is formed with one conductor, and FIG. 9($b$) illustrates a case where a one-turn coil is formed with two flat conductors. When a conductor is energized, magnetic fluxes p (six in FIG. 9) are generated around the conductor according to Ampere's law. In general, magnetic flux lines become denser as approaching a slot opening (that is, a gap between the stator 101 and a rotor) due to the influence of the magnetic resistance distribution in the slot portion. The distribution of the magnetic flux lines is the same in both FIGS. 9($a$) and 9($b$) as long as the energizing current of the one-turn coil is the same. Since the energizing current of the coil changes in an alternating manner when the motor is driven, the magnetic flux φ also changes in an alternating manner. According to the law of electromagnetic induction, an electromotive force U and an eddy current I in the conductor are generated in the conductor in a direction of canceling a magnetic flux change Δφ per minute time Δt, which causes an AC copper loss Pac. A resistance of a path through which the eddy current I in the conductor flows is generally called an AC resistance Rac. The following relationship is established for each physical quantity (~ is a symbol representing proportionality).

$U \sim -\Delta\varphi/\Delta t$ $I \sim U/Rac$ $Pac \sim Rac \times (\text{Square of } I)$ Therefore, Pac can be expressed as follows.

$Pac \sim (\text{Square of } \Delta\varphi)/Rac$

Now, assuming that an AC copper loss generated in the coil 201 in FIG. 9($a$) is 1 pu, and an AC copper loss of the coil 211 is also 1 pu. Two magnetic fluxes φ, which are twice that of the coil 201, are transmitted through the coil 221, and an AC copper loss is proportional to the square, and thus, becomes 4 pu. Similarly, an AC copper loss of the coil 231 is 4 pu, and a total AC copper loss of the four coils is 10 pu. On the other hand, if each coil is formed with two conductors as illustrated in FIG. 9($b$), a transmitted magnetic flux per conductor is halved, and a cross-sectional area of the conductor is halved, so that the resistance Rac of a path through which an eddy current in the conductor flows is doubled. Therefore, AC copper losses generated in the two conductors of the coil 201 are ⅛ pu each, and ¼ pu in total.

Similarly, AC copper losses of the coil 211 are ¼ pu, AC copper losses of the coil 221 are 1 pu, AC copper losses of the coil 231 are 1 pu, and the total AC copper loss of the four coils is 2.5 pu. The AC copper loss in the configuration illustrated in FIG. 9($b$) is the magnitude that is ¼ of that in the configuration illustrated in FIG. 9($a$). When the flat conductor is used in this manner, the AC copper loss can be significantly reduced.

From the above, a one-turn coil is also formed with two conductors in FIG. 1 for the purpose of reducing the AC copper loss. However, when such a configuration is adopted in the related art, there is a drawback that the number of welding points of connection portions of coil ends increases and the manufacturing of the coil becomes complicated. Further, as another method, there is a method of forming a fitting structure in a stator slot and joining coil conductors at this part. However, there is a drawback that it is difficult to solve the trade-off between fitting workability and long-term reliability. The present invention solves these problems, and a specific solution and principle thereof will be described with reference to FIG. 2.

FIG. 2 is an enlarged view focusing on a connection between the one-turn coils 201 and 202 illustrated in FIG. 1, and FIGS. 2($b$) and 1 illustrate a state where the coils are connected in the same manner.

As illustrated in FIG. 2($a$), the one-turn coils 201 and 202 are divided into upper and lower parts at a central portion in the axial direction, and the upper half is formed of flat conductor 201$a$ and conductor 201$b$, and the lower half is similarly formed of flat conductor 202$a$ and conductor 202$b$. The conductor 202 is covered with a thermally expandable sheet 401, and the conductor 202 and the thermally expandable sheet 401 are installed in a stator slot in a combined state, and the conductor 201 is inserted into the slot from above. The conductor 201 in the upper half and the conductor 202 in the lower half are configured to have an L-shaped step shape that allows contact with each other on side surfaces, and are fitted in the slot such that steps are combined with each other as illustrated in FIG. 2($b$). Further, a connection portion between the conductor 201 and the conductor 202 is subjected to conductive surface treatment (for example, is covered with conductive plating). As illustrated in FIG. 2($b$), a conductive plated portion 301$a$ of the conductor 201$a$ faces a conductive plated portion 301$b$ of the conductor 201$b$ and faces a conductive plated portion 302$a$ of the conductor 202$a$. Furthermore, the conductive plated portion 302$a$ of the conductor 202$a$ also faces a conductive plated portion 302$b$ of the conductor 202$b$. As the conductive surface treatment of the connection portion between the conductors, nanoparticle bonding, a conductive paste, or the like may be used instead of the conductive plating.

If the stator coil is overheated in this state, the thermally expandable sheet 401 swells, and thud, a force is generated such that the conductive plated portions of the conductor 201$a$ and the conductor 201$b$ are in close contact with each other as illustrated in FIG. 2($c$). Similarly, the conductive plated portions of the conductor 201$a$ and the conductor 202$a$ are in close contact with each other, and the conductive plated portions of the conductor 202$a$ and the conductor 202$b$ are in close contact with each other. As a result, a state where the respective conductive plated portions are in surface contact in the radial direction is formed, thereby ensuring electrical conduction of the conductors 201$a$, 201$b$, 202$a$, and 202$b$ which have been originally formed as separate bodies.

According to such a method, the thermally expandable sheet has not expanded at a stage of inserting the coil into the stator slot, and thus, a sufficient fitting clearance between the coils can be ensured, and the coil insertion work can be performed extremely easily. Further, it is sufficient to subject the connection portion to the conductive plating treatment, and thus, highly accurate tolerance control is not required, and the manufacturing cost can be suppressed. Further, post-treatment such as pulling and bending or welding after inserting the coil is not required, and it is unnecessary to apply a force in a fitting direction, and thus, the coil is not deformed, and the product reliability can be improved. Further, the expansion pressure of the thermally expandable sheet pressurizes the conductors forming the coil to be pressed against each other so that the surface contact of the connection portion is stably maintained. Thus, it is possible to suppress displacement or disconnection of the connection portion even with long-term electromagnetic vibration, and high reliability can be ensured.

Incidentally, the coils 201 and 202 and the like are covered with the thermally expandable sheet 401 in the illustrated embodiment, but it is sufficient to provide the thermally expandable sheet 401 at a position where the pressure is applied such that the conductive plated portions of the conductors forming the coil are pressed against each other, and the thermally expandable sheet 401 does not necessarily cover the entire circumference of the coils 201 and 202.

A sheet having thermal expandability is obtained by mixing an expansion filler containing a liquefied carbon dioxide gas or the like in a resin that exhibits adhesiveness when heated, such as an epoxy resin, for example, as a base material of a sheet and forming the resultant into a sheet. A form of the sheet is not limited to a form illustrated in FIG. 2 as long as the expansion pressure can be applied for each turn of the coil. As illustrated in FIG. 3($a$), a bobbin 499 that matches a slot shape may be provided to provide a partition for each coil. Incidentally, the thermally expandable sheet 401 and the like are provided inside each space of the bobbin 499 in FIG. 3($a$), the bobbin 499 may be formed of the thermally expandable sheet.

Further, it is sufficient if the state illustrated in FIG. 2($b$) can be realized in the stator slot. Thus. a procedure of inserting each of the conductor 201 and the conductor 202 in a state where the thermally expandable sheet 401 is installed in the stator slot in advance, for example, may be adopted without being limited to the above-described connection procedure. When the above-described bobbin 499 is used, the insertion work can be simplified by adopting this procedure. Further, the insertion work can be simplified by fixing the conductor 201$a$ and the conductor 201$b$ in at least one location using an adhesive to be integrated at a pre-stage of the connection work.

As a method of creating the conductive plated portion, a process of peeling off an insulating coating of a conductor and performing plating is simple, but the method is not limited to this process as long as the electrical conduction of the connection portion and the electrical insulation in the other portions can be ensured. Further, when a film thickness of the conductive plated portion is set to be larger than a thickness of the insulating coating, a conduction surface can be made to slightly protrude from a side surface of the conductor, and the conduction surface can be reliably brought into surface contact. Incidentally, metal forming the coil may be processed to slightly protrude from the side surface of the conductor on the conduction surface (for example, a process of pressurizing the metal perpendicular to a protruding direction).

As illustrated in FIG. 2, a shape of the step at the connection portion between the conductor 201 and the conductor 202 may be a shape in which the flat conductors 201a and 201b are overlapped to form the L-shaped step. However, when the AC copper loss is sufficiently small even if each of the conductors 201 and 202 is formed with one conductor, the connection portions of the conductors 201 and 202 may be processed into an L shape to form conduction surfaces.

As described above, the configuration and principle of the highly efficient and highly reliable rotary electric machine capable of reducing the AC copper loss have been described with the first embodiment of the present invention.

The conductors 211 and 212, the conductors 221 and 222, and the conductors 232 and 231 in FIG. 1 are also formed by the same combinations as the conductors 201 and 202 illustrated in FIG. 2. As illustrated in FIG. 1, it is desirable that the thermally expandable sheets 401, 411, 421, and 431 protrude axially outward from an axial end surface of the stator slot. This is because there is a possibility that an edge of the axial end surface of the stator slot and the insulating coating of the coil rub against each other to damage the insulating coating of the coil, and thus, the thermally expandable sheet is used to protect the insulating coating from the friction with the edge. Although the coil end is illustrated to extend linearly in the axial direction for the sake of simplicity in FIG. 1, the coil end portion is generally folded back in the circumferential direction at the axial end surface in order to reduce the winding resistance, and thus, the edge protection using the thermally expandable sheet is useful even in such a configuration.

Further, there is a possibility that an insulation failure or a conduction failure occurs if dust or moisture is mixed in connection portions 301, 311, 321, and 331 in the stator slot. Thus, it is desirable that axial end surface portions 601 and 602 of the slot be sealed so as to fill a spacing between the conductor and the slot and a spacing between the conductor and the thermally expandable sheet. With such a configuration, it is possible to suppress the mixing of dust into the slot and improve the long-term reliability.

Here, conductive plated portions of the connection portions 301, 311, 321, and 331 illustrated in FIG. 1 are charged equivalent to a motor terminal voltage. The behavior of such a part as an electrode at this time will be described hereinafter. Regarding the axial direction of the stator 101, a sufficient withstand voltage can be ensured by creepage insulation of the thermally expandable sheet. Regarding a circumferential surface, a potential difference occurs because an inner wall (electromagnetic steel sheet) of the stator slot is generally grounded, but this can also ensure a sufficient withstand voltage by through-layer insulation of the thermally expandable sheet. Regarding a radial surface of the conductive plated portion, it is necessary to ensure a creepage insulation distance from the inner wall (electromagnetic steel sheet) of the stator slot, but a sufficient withstand voltage can be ensured by providing an overlapping portion 431a of the thermally expandable sheet as illustrated in FIG. 3(b).

FIG. 4 illustrates a method of fixing the conductors 201 and 202 more firmly. In FIG. 4, concave portions 501 and 502 are provided on side surfaces of the conductors 201 and 202 in the stator slot, respectively. The concave portions 501 and 502 may be provided with a predetermined distance with respect to the connection portions 301 and 302, and may also be provided with a predetermined distance from an end of a thermally expandable sheet. With such a configuration, the thermally expandable sheet is invaginated in the concave portions 501 and 502, and thus, the displacement of the conductors 201 and 202 or the removal of the stator slot caused by the electromagnetic vibration can be suppressed, and further, the entry of dust into the connection portion can be suppressed, so that the long-term reliability can be improved.

Incidentally, the concave portions 501 and 502 are provided on a radial side surface of the conductor in FIG. 4, but the concave portions may be provided on another side surface (for example, the entire outer circumference of the portion).

As described above, a welding point of the coil end portion can be eliminated as illustrated in FIG. 5 according to the first embodiment, and thus, an axial length of the motor can be shortened so that further miniaturization can be realized.

Second Embodiment

Figure 6:
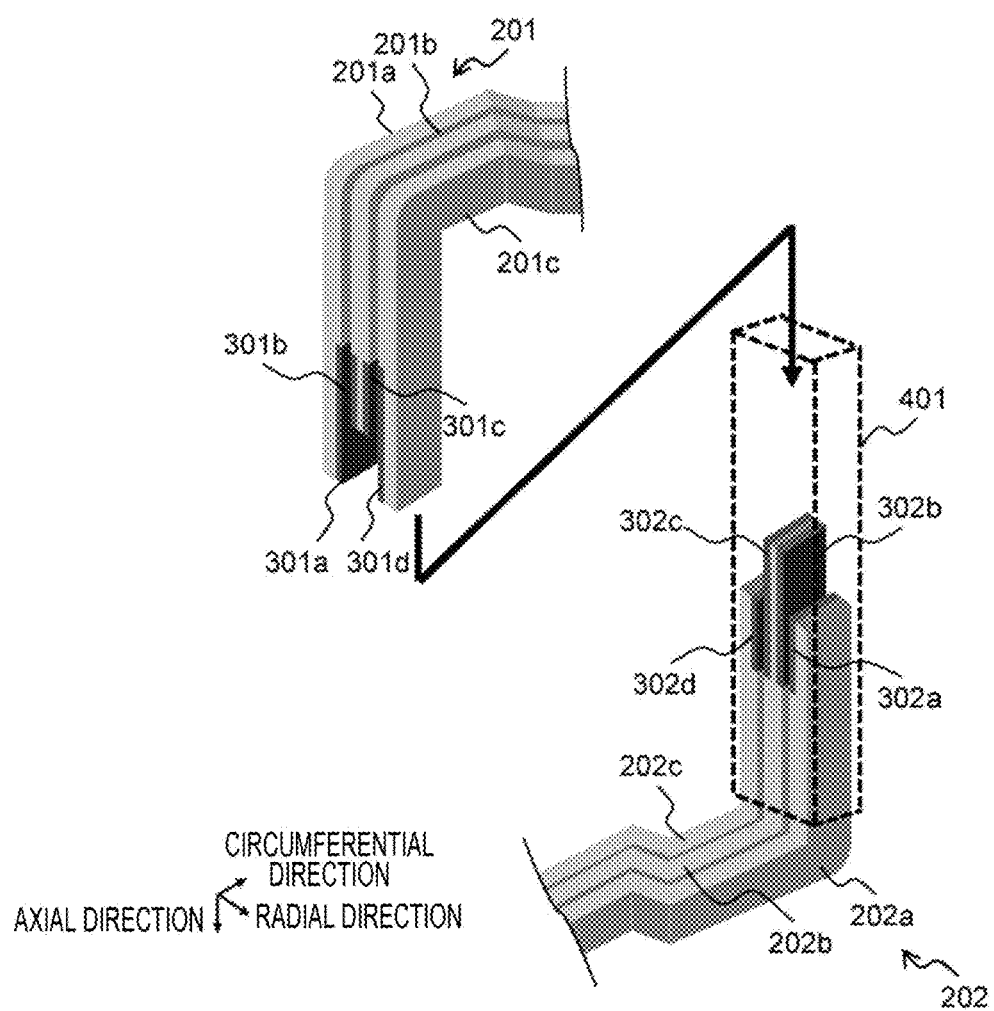
FIG. 6 is a view illustrating a coil connection method according to a second embodiment of the present invention.

A second embodiment of the present invention will be described with reference to FIG. 6. FIG. 6 is a view illustrating a coil connection method according to the second embodiment of the present invention.

A difference between a configuration illustrated in FIG. 6 and the configuration illustrated in FIG. 2 is that the one-turn coils 201 and 202 are divided into upper and lower parts at an axial center, the upper half is formed of the conductor 201a, the conductor 201b, and the conductor 201c which are flat, and the lower half is similarly formed of the conductor 202a, the conductor 202b, and the conductor 202c which are flat. As the one-turn coil is formed with three conductors in each of the upper and lower parts in this manner, the one-turn coil can be formed with the flat conductors, and thus, an AC copper loss can be further reduced, and a highly efficient rotary electric machine can be obtained.

Third Embodiment

A third embodiment of the present invention will be described with reference to FIG. 7. FIG. 7 is a cross-sectional view of a coil according to the third embodiment of the present invention.

Figure 7A:
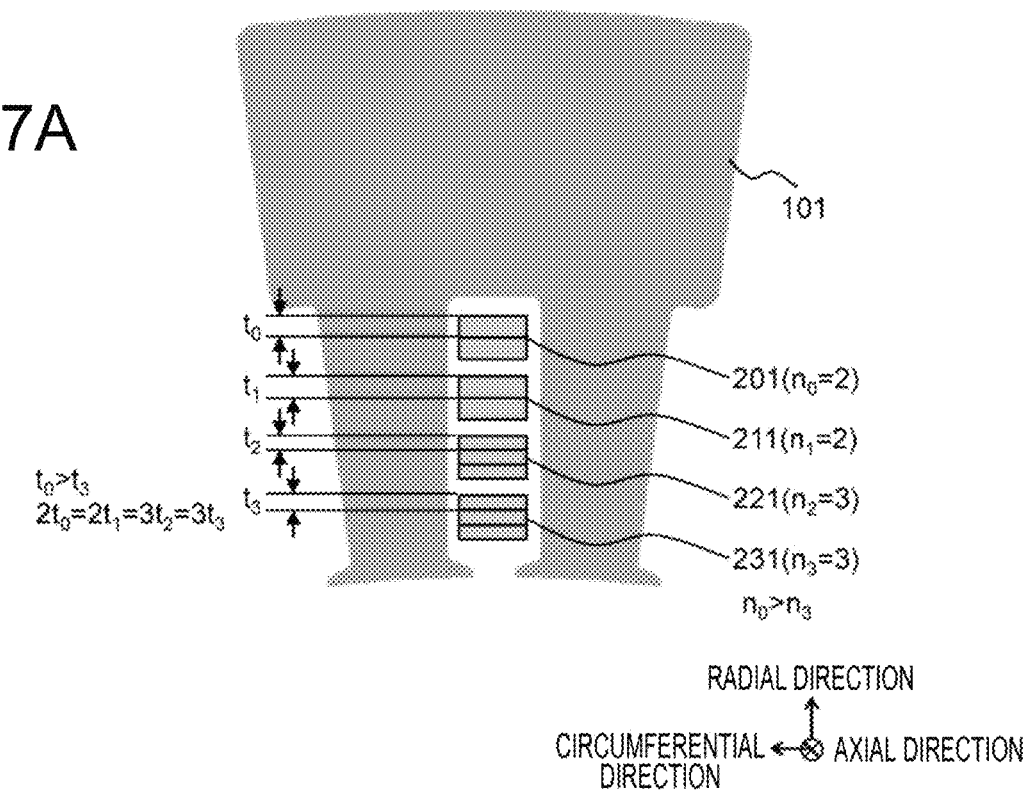
FIGS. 7A and 7B are cross-sectional views of a coil according to a third embodiment of the present invention.

A difference between a configuration illustrated in FIG. 7(a) and the configuration illustrated in FIG. 3 is that the number of conductors n0 of a coil farthest from a gap and the number of conductors n3 of a coil closest to the gap are set such that n0<n3 regarding the number n (n is a natural number) of conductors constituting a one-turn coil. An AC copper loss increases as approaching a slot opening of a slot (gap between a stator and a rotor), and thus, the AC copper loss can be further reduced by increasing the number of conductors of the coil close to the gap to make one conductor flatter as illustrated in FIG. 9.

Incidentally, each thickness t of the four coils is set such that 2t0=2t1=3t2=3t3, in an aspect illustrated in FIG. 7(a), but the number of conductors is preferably set such that n0<n3 even if 2t0=2t1<3t2=3t3.

Figure 7B:
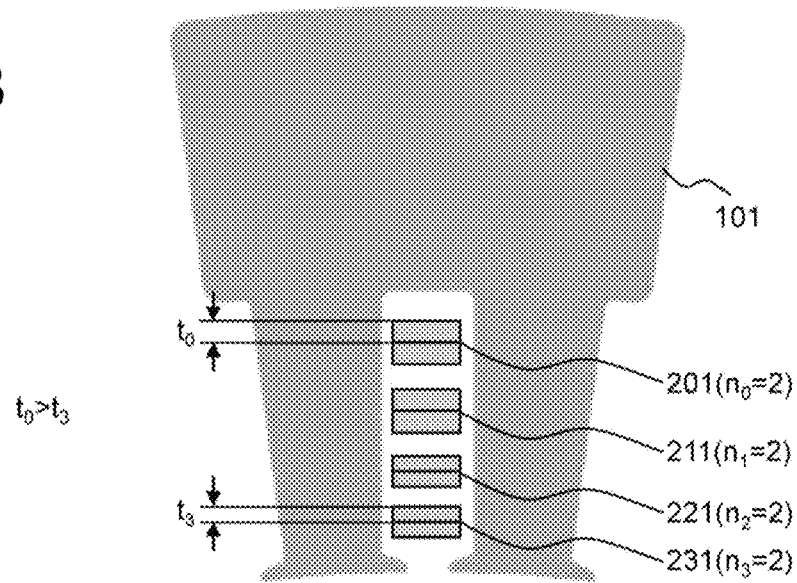

On the other hand, in FIG. 7(b), the number of conductors forming a one-turn coil is the same for a plurality of coils in the slot, and a radial thickness t0 of a conductor farthest from the gap and a radial thickness t3 of a conductor closest to the gap are set such that t0>t3 regarding a radial thickness t of the conductor. In this manner, the AC copper loss can be further reduced by making the coil conductor close to the gap flatter.

Fourth Embodiment

Figure 8:
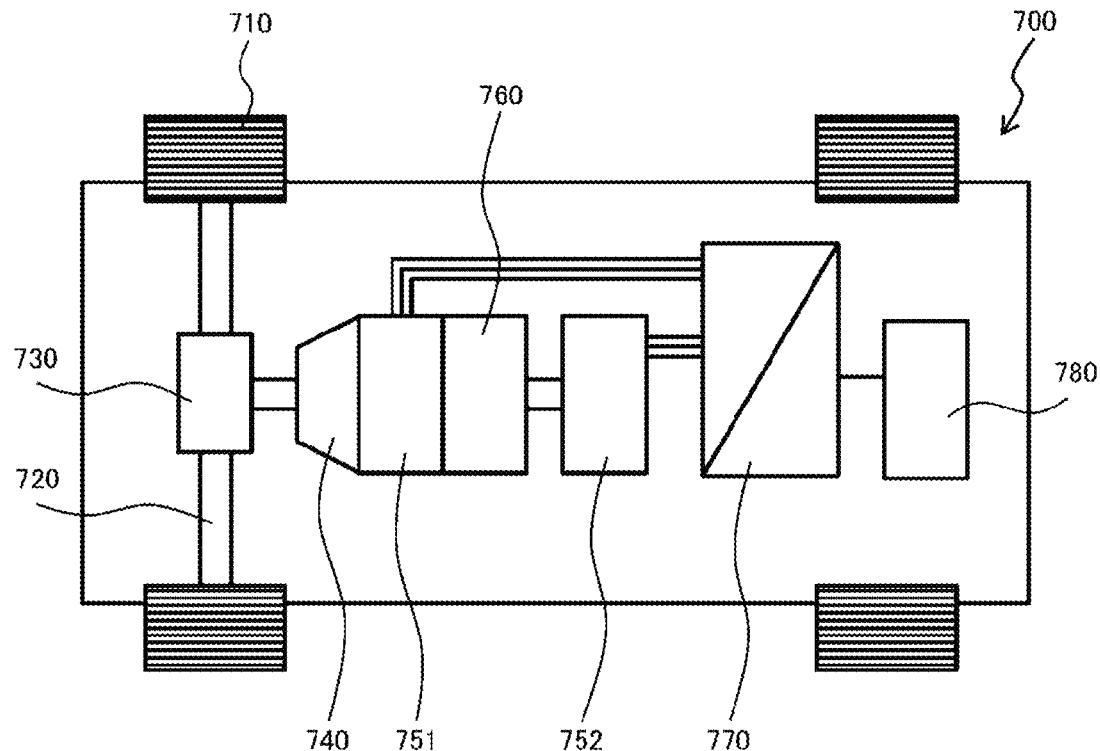
FIG. 8 is a diagram illustrating a vehicle according to a fourth embodiment of the present invention.

A fourth embodiment of the present invention will be described with reference to FIG. 8. FIG. 8 is a diagram illustrating a vehicle according to the fourth embodiment of the present invention.

The present invention is applied to rotary electric machines 751 and 752 in a vehicle 700 illustrated in FIG. 8. As illustrated in FIG. 8, the vehicle 700 is, for example, a hybrid vehicle or a plug-in hybrid vehicle, and is equipped with an engine 760, the rotary electric machines 751 and 752, and a battery 780.

When driving the rotary electric machines 751 and 752, the battery 780 supplies DC power to a power conversion device (inverter device) 770 for driving. The power conversion device 770 supplies AC power converted from the DC power from the battery 780 to each of the rotary electric machines 751 and 752.

Further, during regenerative traveling, the rotary electric machines 751 and 752 supply AC power generated according to the kinetic energy of the vehicle to the power conversion device 770. The power conversion device 770 converts the AC power from the rotary electric machines 751 and 752 into DC power, and supplies this DC power to the battery 780.

Rotation torques by the engine 760 and the rotary electric machines 751 and 752 are transmitted to wheels 710 via a transmission 740, a differential gear 730 and an axle 720.

In general, automobiles are required to have a wide range of kinetic performance such as a low-speed large torque when starting on a slope, a high-speed low torque on a highway, and a medium-speed medium torque in city driving. In such a wide range of kinetic performance, the rotary electric machines 751 and 752 to which the present invention is applied enable a highly efficient operation. Furthermore, a heat loss is reduced, and thus, it is possible to improve the safety and extend the life of the vehicle 700. Further, the cruising range of the vehicle 700 can be extended.

Incidentally, the same effects can be obtained by applying the rotary electric machine of the present invention to an electric vehicle that is not equipped with the engine 760 but is driven only by power of the rotary electric machine.

Furthermore, the same effects can be obtained by applying the rotary electric machine of the present invention even in an electric vehicle with a so-called in-wheel motor which is not equipped with the transmission 740 but has a shaft of the rotary electric machine directly connected to the wheels 710.

As described above, according to the embodiments of the present invention, in the rotary electric machine including the stator 101 around which the plurality of coils 201, 211, 221, and 231 are wound and the rotor (not illustrated) which is supported to be freely rotatable with a predetermined gap with respect to the stator 101, the coils 201 and 202 and the like have at least one connection portion per turn in the slot of the stator 101. The conductors 201a and 201b and the like to be connected mutually have the steps at the connection portion, and are fitted with the other conductors 202a and 202b and the like so as to mutually fill the steps. The step has the contact surfaces (conductive plated portion 301a and the like) that come into each other in the radial direction in the slot to be electrically conducted. The thermally expandable sheet 401 and the like capable of pressurizing the coils 201 and 202 and the like in the radial direction of the stator 101 are arranged in the slot. Since the coils 201 and 202 and the like are covered with the thermally expandable sheet 401 and the like, it is possible to maintain the reliable contact at the contact portion, both the fitting workability and the long-term reliability can be achieved, and the highly efficient and highly reliable rotary electric machine can be provided.

Further, the coil conductor closest to the gap is flattened by setting the number of conductors n3 of the coil closest to the gap to be larger than the number of conductors n0 of the coil farthest from the gap regarding the number n of conductors forming one turn of the coil, and thus, the AC copper loss can be reduced.

Further, regarding the radial thickness t of the conductor, the radial thickness t3 of the conductor closest to the gap is set to be smaller than the radial thickness t0 of the conductor farthest from the gap, and thus, the AC copper loss can be reduced.

Further, the contact surfaces where the conductors 201a and 201b and the like come into contact with each other are covered with the conductive plating 301a, 301b, 302a, and 302b and the like, and thus, the conduction failure in the contact surfaces caused by deterioration with aging can be suppressed.

Further, the side surfaces of the conductors 201a and 201b and the like other than the contact surfaces are covered with the insulating coating, the insulation between adjacent conductors can be ensured.

Further, the contact surface protrudes from the portion covered with the insulating coating, the contact surfaces can be reliably brought into contact with each other.

Further, the conductors 201a, 201b, 202a, and 202b and the like have concave portions 501a, 501b, 502a, and 502b into which the thermally expandable sheet 401 and the like can be invaginated, at positions in the slot, and thus, it is possible to suppress the displacement of the conductors 201a, 201b, 202a, and 202b or the disconnection from the stator slot caused by the electromagnetic vibration. Further, the dust can be suppressed from entering the connection portion, and thus, the long-term reliability can be improved.

Further, the thermally expandable sheet 401 and the like protrude axially outward from the axial end surface portions 601 and 602 of the slot, and thus, it is possible to suppress the damage to the insulating coating of the coil caused by rubbing between the edge of the axial end surface of the stator slot and the insulating covering of the coil, and the long-term reliability can be improved.

Further, the thermally expandable sheet 401 and the like fill the spacing between the conductor and the slot in the axial end surface portions 601 and 602 of the slot, and thus, it is possible to suppress the entry of dust into the slot and to improve the long-term reliability.

Further, the rotary electric machines 751 and 752 of the present embodiment, the battery 780, and the power conversion device 770 that converts the DC power of the battery into AC power and supplies the AC power to the rotary electric machines are provided. Thus. it is possible to provide the vehicle equipped with the highly efficient and highly reliable rotary electric machines.

Incidentally, the present invention is not limited to the above-described embodiments, and may include various modifications and equivalent configurations that fall within the scope of the appended claims. For example, the above-described embodiments have been described in detail in order to describe the present invention in an easily understandable manner, and the present invention is not necessarily limited to one including the entire configuration that has been described above. Further, a part of the configuration of a certain embodiment may be replaced with the configuration of another embodiment. Further, the configuration of a certain embodiment may be added with the configuration of another embodiment. Further, addition, deletion or substitution of other configurations may be made with respect to some configurations of each embodiment.

REFERENCE SIGNS LIST 1 vehicle
2 truck
3 gearbox
4 wheel
101 stator
201,202,211,212,221,222,231,232 coil conductor
301,302,311,312,321,322,331,332 conductive plating
401,411,421,431 thermally expandable sheet
501,502 concave portion
601 coil end seal portion
700 vehicle
710 wheel
720 axle
730 differential gear
740 transmission
751,352 rotary electric machine
760 engine
770 power conversion device
780 battery

The invention claimed is:

1. A rotary electric machine comprising:
a stator around which a plurality of coils are wound; and
a rotor which is supported to be freely rotatable with a predetermined gap with respect to the stator,
wherein the coil is configured with two coil conductors each of which is inserted from opposite side of the slot, and has at least one connection portion in which the two coil conductors are connected, per turn in a slot of the stator,
at the connection portion, the two coil conductors each forms L-shaped step including a contact surface faced to radial direction and a step surface faced to axial direction at the connection portion, and are fitted with another coil conductors so as to mutually fill the steps,
a conductor in an upper half of the coil and a conductor in a lower half of the coil are configured to have the L-shaped step shape that allows contact with each other on the contact surfaces of the coil conductors,
the contact surfaces that come into contact with each other in the slot are electrically conducted,
a thermally expandable sheet capable of pressurizing the coil conductor in a radial direction of the stator is arranged to cover the coil conductor in the slot, the thermally expandable sheet expands and presses the contact surfaces of two or more coil conductors, and
two or more coil conductors per winding are inserted to each of one side of the slot.

2. The rotary electric machine according to claim 1, wherein
regarding a number of conductors forming the coil conductor, a number of conductors of the coil conductor closest to the gap is larger than a number of conductors of the coil conductor farthest from the gap.

3. The rotary electric machine according to claim 1, wherein
regarding a thickness of the coil conductor in the radial direction of the stator, a thickness of the coil conductor closest to the gap is smaller than a thickness of the coil conductor farthest from the gap.

4. The rotary electric machine according to claim 1, wherein
the contact surfaces are covered with conductive plating at the connection portion.

5. The rotary electric machine according to claim 1, wherein
a side surface other than the contact surface of the conductor forming the coil conductor is covered with an insulating coating.

6. The rotary electric machine according to claim 5, wherein
the contact surface protrudes from a portion covered with the insulating coating.

7. The rotary electric machine according to claim 1, wherein
the conductor has a concave portion in which the thermally expandable sheet is invaginable, at a position in the slot.

8. The rotary electric machine according to claim 1, wherein
the thermally expandable sheet projects outward from an axial end surface of the slot.

9. The rotary electric machine according to claim 1, wherein
the thermally expandable sheet fills a spacing between the coil conductor and the slot on an axial end surface of the slot.

10. A vehicle comprising:
the rotary electric machine according to claim 1;
a battery; and
a power conversion device that converts DC power of the battery into AC power and supplies the AC power to the rotary electric machine.

* * * * *